(12) United States Patent
Sutton

(10) Patent No.: US 10,634,215 B2
(45) Date of Patent: Apr. 28, 2020

(54) TUBULAR CONTAINMENT PART FOR A FLYWHEEL CONTAINMENT ASSEMBLY AND METHOD FOR MANUFACTURING SAME

(71) Applicant: TATA STEEL UK LIMITED, London (GB)

(72) Inventor: Clive Sutton, Kenilworth (GB)

(73) Assignee: TATA STEEL UK LIMITED, London (GB)

( * ) Notice: Subject to any disclaimer, the term of this patent is extended or adjusted under 35 U.S.C. 154(b) by 419 days.

(21) Appl. No.: 14/917,462

(22) PCT Filed: Aug. 22, 2014

(86) PCT No.: PCT/EP2014/002303
§ 371 (c)(1),
(2) Date: Mar. 8, 2016

(87) PCT Pub. No.: WO2015/036088
PCT Pub. Date: Mar. 19, 2015

(65) Prior Publication Data
US 2016/0223051 A1    Aug. 4, 2016

(30) Foreign Application Priority Data

Sep. 11, 2013  (EP) .................................... 13004428

(51) Int. Cl.
*B32B 15/01*        (2006.01)
*B32B 15/04*        (2006.01)
(Continued)

(52) U.S. Cl.
CPC .............. *F16F 15/315* (2013.01); *B32B 1/08* (2013.01); *B32B 3/28* (2013.01); *B32B 7/02* (2013.01);
(Continued)

(58) Field of Classification Search
None
See application file for complete search history.

(56) References Cited

U.S. PATENT DOCUMENTS 2,870,236 A * 1/1959 Heininger ................ H01B 3/20
                                            174/17 R
3,176,618 A *  4/1965 Forsberg ................... F02K 9/10
                                            102/284
(Continued)

FOREIGN PATENT DOCUMENTS

JP           H10-193467 A      7/1998

OTHER PUBLICATIONS

Maity et al., "Heat Transfer—Engineering Applications (Chapter 13: Ultrahigh Strength Steels)", 2011, Intech, pp. 309-336. (Year: 2011).*

(Continued)

*Primary Examiner* — Humera N Sheikh
*Assistant Examiner* — Xiaobei Wang
(74) *Attorney, Agent, or Firm* — Vorys, Sater, Seymour and Pease LLP

(57) ABSTRACT

A tubular containment part used in a flywheel containment assembly, wherein the tubular containment part is built up of easily configurable layers of different materials and wherein the containment casing is included a spirally wound tubular structure formed from layers made of one or more different materials. The invention further relates to a method for manufacturing such a tubular containment part.

21 Claims, 1 Drawing Sheet

(51) Int. Cl.
- B32B 15/14    (2006.01)
- B32B 15/18    (2006.01)
- B32B 15/20    (2006.01)
- B32B 1/08     (2006.01)
- B32B 38/18    (2006.01)
- B32B 37/20    (2006.01)
- B32B 37/14    (2006.01)
- F16F 15/31    (2006.01)
- F16F 15/315   (2006.01)
- B32B 3/28     (2006.01)
- B32B 7/02     (2019.01)
- B32B 38/00    (2006.01)

(52) U.S. Cl.
CPC ............ *B32B 15/043* (2013.01); *B32B 15/14* (2013.01); *B32B 15/18* (2013.01); *B32B 15/20* (2013.01); *B32B 37/144* (2013.01); *B32B 37/20* (2013.01); *B32B 38/1808* (2013.01); *B32B 2038/0076* (2013.01); *B32B 2250/42* (2013.01); *B32B 2260/023* (2013.01); *B32B 2262/0269* (2013.01); *B32B 2262/101* (2013.01); *B32B 2262/103* (2013.01); *B32B 2262/106* (2013.01); *B32B 2305/076* (2013.01); *B32B 2307/54* (2013.01); *B32B 2307/558* (2013.01); *B32B 2307/56* (2013.01); *B32B 2439/62* (2013.01); *B32B 2571/00* (2013.01); *B32B 2597/00* (2013.01); *B32B 2605/00* (2013.01); *F16F 2224/0208* (2013.01); *F16F 2224/0241* (2013.01); *F16F 2226/04* (2013.01); *F16F 2230/10* (2013.01)

(56) References Cited

U.S. PATENT DOCUMENTS

| | | | | |
|---|---|---|---|---|
| 3,264,536 | A * | 8/1966 | Robinson | C08G 65/4012 361/323 |
| 3,695,966 | A * | 10/1972 | Kuhns | B27D 1/083 156/190 |
| 3,964,341 | A * | 6/1976 | Rabenhorst | F16C 15/00 74/572.12 |
| 5,285,699 | A * | 2/1994 | Walls | B29D 99/0046 74/572.12 |
| 5,382,774 | A * | 1/1995 | Bruck | B01J 35/04 219/553 |
| 5,466,503 | A * | 11/1995 | Dischler | F41H 5/0485 428/113 |
| 6,044,726 | A * | 4/2000 | Blake | F16F 15/30 74/572.11 |
| 6,203,924 | B1 * | 3/2001 | Smith | B32B 15/01 428/593 |
| 2005/0188777 | A1 | 9/2005 | Wingett et al. | |
| 2012/0141258 | A1 | 6/2012 | Makulec et al. | |

OTHER PUBLICATIONS

International Search Report dated Nov. 17, 2014 from International Application PCT/EP2014/002303 to Tata Steel UK Limited filed Aug. 22, 2014.

* cited by examiner

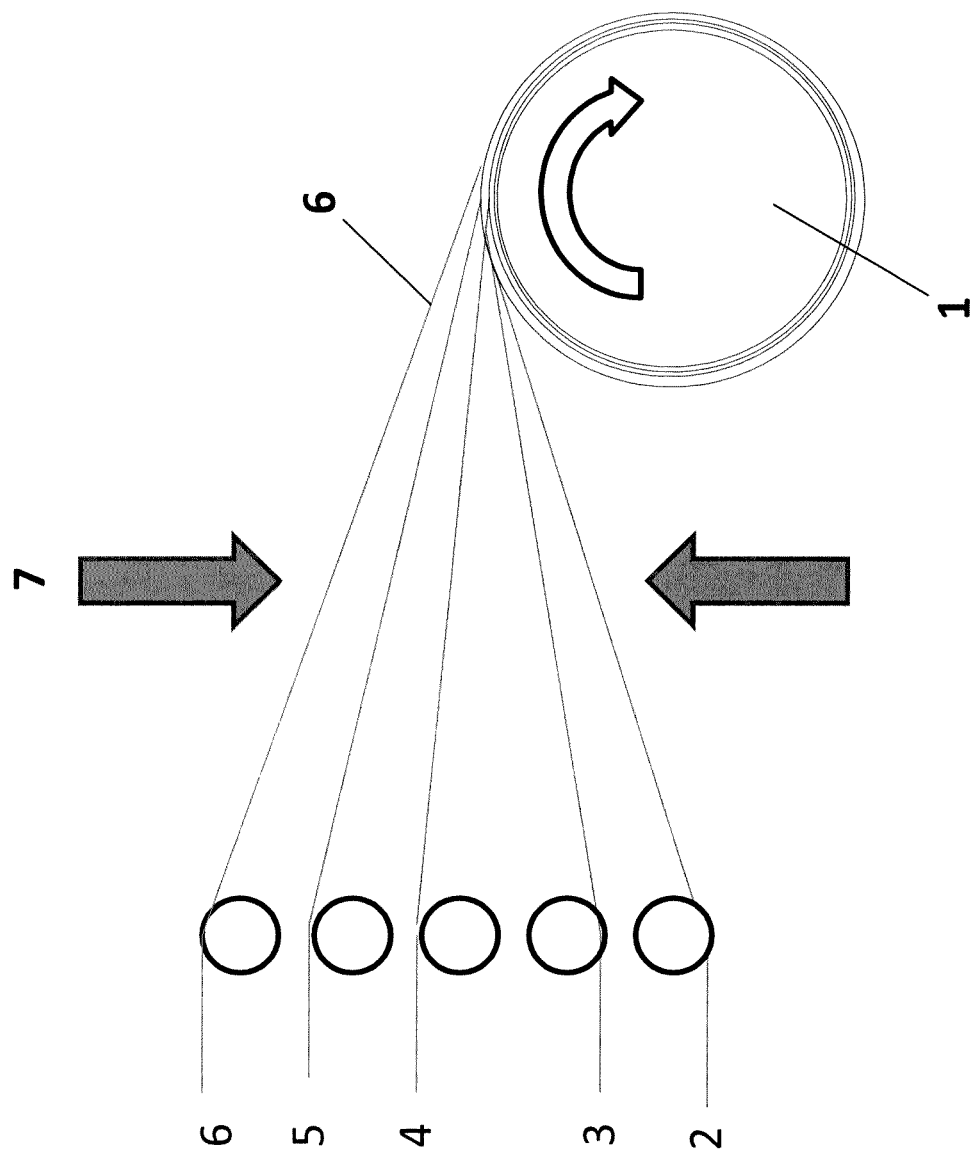

TUBULAR CONTAINMENT PART FOR A FLYWHEEL CONTAINMENT ASSEMBLY AND METHOD FOR MANUFACTURING SAME

CROSS-REFERENCE TO RELATED APPLICATIONS

This is a § 371 US National Stage Application of International Application No. PCT/EP2014/002303 filed on Aug. 22, 2014, claiming the priority of European Patent Application No. 13004428.2 filed on Sep. 11, 2013.

FIELD OF THE INVENTION

The invention relates to a tubular containment part for a flywheel containment assembly, more in particular for high speed flywheels such as mechanical, electro-mechanical flywheels and motor-generators used for the temporary storage of energy. The invention also relates to a mass-production viable method for making containments to a range of specifications.

BACKGROUND OF THE INVENTION

High speed mechanical, electro-mechanical flywheels and motor-generators are increasingly being used as an alternative to battery energy storage in both static and mobile situations due to their design longevity and capacity for handling very high energy charge and discharge rates. However, at working speeds, typically in the range of 20,000 to 120,000 RPM, these flywheels store very significant amounts of kinetic energy. If a flywheel were to fail, the instantaneous release of this energy poses a lethal risk to persons and the integrity of surrounding equipment through the release of ballistic fragmentation of the primary rotating flywheel fragments and a secondary field of fragments if the containment casing breaks up in response.

A number of energy storage flywheel containments are known which aim to provide a solution for the risks of mechanical failure of an energy storage flywheel. In US2005/0188777 for instance, a containment assembly is disclosed with a number of individual and coaxial cylindrical steel shields with a vibration damping material between the shields. The containment structure disclosed in U.S. Pat. No. 6,203,924 consists of a number of coaxial cylindrical layers with an inner structural layer, an energy absorbing layer and an outer support layer, wherein different materials are used for the successive layers.

The most common form of burst containment is that used in gas turbines, where expensive aerospace grade materials are used to form strong and discrete 'hoops' of energy-absorption material around specific narrow turbine blade discs. There may be several of these in the form of narrow annular layers down the length of a typical gas turbine engine.

Current containment solutions developed for mobile/automotive applications are typically cylinders made using machine-finished cast aluminium or are machined to final shape using chip removal from solid steel billet. These two solutions can be heavy, and in all known cases are bespoke-manufactured—making them expensive and too slow to make to be mass-production viable. Furthermore, the release of kinetic energy stored in a flywheel, which is in the order of 200 kJ for a small braking energy recovery system on a passenger car, would be expected to fracture and disintegrate such a containment vessels, resulting in a secondary and possibly more dangerous fragment field flying away from the device in unspecified directions, and at high speed.

OBJECTIVES OF THE INVENTION

It is an objective of the present invention to provide a cost-effective and easily adapted solution to the manufacture of a tubular containment part for a flywheel containment assembly that are fully capable of absorbing the kinetic energy released, if the flywheel within the casing tube failed.

It is another objective of the present invention to provide a tubular containment part for a flywheel containment assembly which is capable of fully containing the fragments produced by the rotating flywheel were it to fail in service.

It is another objective of the present invention to provide a tubular containment part for a flywheel containment assembly using both continuous and multiple layers of differing material.

It is another objective of the present invention to provide a tubular containment part for a flywheel containment assembly optimised for reasons of strength and weight to the containment task for a specific flywheel mass and operating speed design.

It is another objective of the present invention to provide a tubular containment part for a flywheel containment assembly which can without difficulty be configured to meet specific size and strength requirements for the containment vessel.

It is still another objective of the present invention to provide a tubular containment part for a flywheel containment assembly which can be manufactured easily and cost-effectively in industrial scale volume manufacturing.

DESCRIPTION OF THE INVENTION

According to a first aspect of the invention one or more of the objectives of the invention are realized by providing a tubular containment part for a flywheel containment assembly, wherein the tubular containment casing part is made up of layers of different materials, characterized in that the layers of different material of the tubular containment casing part are continuous layers spirally wound over each other, the continuous layers comprising a first layer of a structural material and one or more successive layers made up of one or more different materials wherein the inside wall of the tubular casing part is formed by the structural material of the first layer.

The tubular containment part is built up of continuous layers of different materials, wherein "continuous" means that a strip or web of a certain material is wound as continuous spiral. It does however not necessarily mean that each spiral of a certain material is wound over the same number of windings as another material. Instead of having a repeated "sandwich" of different material for every turn it is also possible to change the composition of the "sandwich" for the turn or turns on or near the outside of the containment part. This allows to manufacture containment parts for a wide range of flywheel containment assemblies with specific size and strength requirements.

The spirally wound casing according to the invention provides a tight winding of several different layers as required to manage the fragment burst energy in a specific flywheel design. Because of the tight winding of the "sandwich" of layers the wall thickness of the tubular containment part can be less than with current monolithic 'machined from solid' containment casings and therefore lighter. At the same time because of the tightly wound layers, their effectiveness in respect of absorbing the kinetic energy released during mechanical failure of a flywheel and preventing the fragmented parts of a failed flywheel from fully penetrating the tubular containment part thus formed, is improved.

According to a further aspect of the invention it is provided that the first layer of the structural material is a steel strip wherein the steel is selected from the group consisting of high-strength low-alloy steel, bainitic steels TWIP grades and medium to high carbon steels. For this layer also the gauge and surface hardness characteristics is determined dependent on the requirements for a flywheel containment assembly. The performance of this first layer or any other steel layer can also be improved further by the use of chemical or heat-treatment based surface treatments to enhance e.g. toughness or hardness.

The steels used for some of the one or more successive layers of the containment part 'sandwich' are typically those with good elongation and strength properties, which will result in the casing assembly made from said material absorbing part of the kinetic energy of the fragments of a fractured flywheel by energy absorption due to elongation of the steel and surface energy as a result of deformation as a fragment cuts through the inner steel layers.

Besides providing an initial ballistic-resistant surface, the spirally wound first layer or innermost layer of steel material is also used as supporting layer for subsequent sandwiched successive layers of fibre and other metallic materials that comprise the tubular containment part.

The one or more successive layers are made of a strip or web of one or more materials selected from the group of materials consisting of aluminium, aluminium alloys, fibre materials and alloy steels. The fibre materials can be a metal or plastic fibre material or a combination thereof.

The fibre material comprises aramid fibres, nylon fibres, glass fibres, carbon fibres, steel fibres. These fibre materials are used to present a 'net' barrier that will absorb the remaining kinetic energy of the flywheel fragments should these fragments could cut through the entire 360 degree layered barrier presented to fragments by the whole containment part.

The metal layers of the one or more successive layers are typically high elongation and low strength metals which can be provided as multiple thin sheets for an inter-layer. As an alternative these metals can be provided in one or more of the metal successive layers as a corrugated metal layer to increase containment space, the voids of which may be filled or partially filled by suitably selected organic, inorganic or eutectic phase-change materials which would consume kinetic energy as they change from their natural solid state to a liquid state—as a result of the heat generated locally during the passage of fragments through those layers.

According to a further aspect of the invention the fibre materials will be comprised of a mix of aramid fibres, Nylon fibres, glass fibres, carbon fibres and steel fibres. According to a still further aspect these fibre materials are dry layered, wet-laid up or embedded in a prepreg resin for later elevated heat curing once the tubular containment part is formed to shape A layer could also comprise an alternation of thin sheet metal and fibre material, wherein the fibre material can be embedded in a prepreg resin, dry laid or continuously wet laid up to suit the containment requirement.

According to another aspect of the invention it is provided that within a layer of fibre material or within different layers of fibre material the fibres are provided in groups with different orientations and warp and weft combinations with respect to each other. In this manner 'net-like' structures are created capable of catching those fragments of a flywheel that have penetrated the containment casing up to these fibre layers.

The first layer and the multiple successive sandwich layers thus formed, extend more than one complete turn to form a spiral wound tubular containment part.

The invention also provides for a containment assembly for a flywheel comprising a tubular containment part according to the above description, wherein the containment part is mounted at opposite sides in end members. According a further aspect the containment part is held in a groove cut into these end members that are clamped axially or otherwise held in place with respect to the containment part, resulting in further dissipation of energy during a burst event—as the containment part may or may not be enabled to 'spin' within the groove formed into these end members. It is anticipated that the end members would also hold the bearings that in turn attach to spindles on the flywheel and thus hold the flywheel on its rotational axis also enabling the tube casing to be used to mount the entire assembly to e.g. the vehicle chassis.

As a flywheel burst event initiates, the flywheel fractures in a single or occasionally multiple locations and then fragments into both large and small pieces—each flying away at high radial and tangential velocity from the axis of rotation. In the worst case the flywheel breaks just into two or three large pieces moving at typically high tangential (circa 1000 m/s) velocity with respect to the spin axis of the flywheel.

These fragment-pieces then impact the inner layer of the tubular containment part with a tangential and a radial component of velocity. Depending on the energy of each fragment, these fragments will be deflected or more likely, progressively penetrate, the first layer and one or more of the successive layers making up the containment part. A fragment will typically encounter the hard inner first layer of the first winding, then the progressively softer layers capable of slowing down the fragment, whilst also coping with smaller fragment sizes as the larger fragments break into smaller pieces. These smaller fragments would then encounter the hard layers of the windings again, and the process repeats as the fragments gradually penetrate each sandwiched layer with less and less energy. Using this laminated/sandwiched barrier approach to fragment containment ensures that a fragment must re-create a new crack in each layer—rather than split a single crack further—which is the case where a casing tube is formed from a monolithic/solid material. With the spirally wound tubular containment part proposed the energy absorbed is therefore dissipated into heat, deformation surface energy in the first layer and the one or more successive layers as compared to the case of flywheel fracture within a monolithic cast or machined-from-solid containment casing.

With the tubular containment part according to the invention the specification of the containment wall is also easily configurable to the diameter, performance, the mass and the cost required to contain fragmentation for a specific flywheel type through choice of the materials and thickness of the sandwich layers formed into the tubular containment part—e.g. specification of grades and gauges of steel, aramid, carbon fibres and other materials, and through the choice of the number of full windings on the casing (and therefore containment part wall thickness), so formed.

In addition, the orientation of the spiral turns that form the tubular containment part may also be easily configured relative to the direction of rotation of the flywheel—thereby delivering the best energy absorption characteristics over the longest possible burst event time period yet at optimum performance, weight and manufacturing cost.

The invention also provides for a method for the manufacturing of a tubular containment part for a flywheel containment assembly, wherein the method comprises the steps of:

selecting a steel strip for a first layer of structural material wherein the steel is selected from the group consisting of high-strength low-alloy steel, bainitic steels, TWIP steel grades and medium to high carbon steels, selecting a strip or web of a material for each of the one or more successive layers from the group of materials consisting of aluminium, aluminium alloys, fibre materials and alloy steels, and winding the strips of the first layer and the one or more successive layers into a spiral such that the inside wall of the thus formed tubular containment part is formed by the structural material of the first layer.

The different layers are wound as a continuous strip or web over at least more than one turn. In most cases the final tubular containment part consist of several turns of different continuous layers. The indication "continuous" means that the material of a specific layer is continuous, not that it is necessarily continued over all turns of the containment part. The first layer or any of the successive layers may be continued with a strip or a web of another material after one or more turns. The first layer or a successive layer may also be continued for part of a turn or an extra turn to provide a uniform outside surface for the tubular containment part.

The steels selected for the first layer of the sandwich, forming the inside wall of the tubular containment part, are typically steels that provide a low-cost structural material with suitable elongation and strength properties for the purpose with good surface hardness and toughness.

The metal used for the successive sandwich layers are preferably high elongation materials which can be provided as multiple thin sheets, comprised of straight or woven 'cloth' fibre materials or corrugated sheet metal materials.

The fibre material layers may be comprised of aramid fibres, nylon fibres, glass fibres, carbon fibres, steel fibre such as tyre cord, or other metallic fibres—woven into single or multiple weft fabric and with the weft and warp directions orientated suitably to the flywheel rotational axis, such that their fragment capture and energy-absorbing effect is maximised.

According to a further aspect of the invention one or more of the successive layers comprises a fibre material impregnated with a curable resin and wherein the strip of structural material of the first layer with the one or more applied successive layers including an impregnated layer is subjected to subsequent post-manufacture room temperature or elevated temperature curing operation.

The curing operation may be carried out after the layers are wound into a tubular containment part or using appropriate equipment, the curing may be initiated at the point of winding of the layers onto the mandrel as the tubular containment part is formed.

The first layer and the one or more successive layers are preferably fed from separate supplies into a continuous or semi-continuous production line to form the multi-layered spirally wound tubular containment part. With the different materials on separate coils it is easy to position these coils in accordance with the desired succession of layers in the containment part.

As an alternative to winding different layers of material into a tubular containment part it is provided that a coil is wound of a multi-layered 'sandwich' strip as an intermediate product, wherein the strip has a length sufficient for a large number of tubular containment parts. At a production location an appropriate length of the multi-layered material can be cut from the intermediate coil and spirally wound into a tubular containment part according to specification. The strip can also be wound first on a mandrel or the like before cutting the strip to the desired length.

In order to obtain the appropriate inner cylindrical shape and dimensions of the tubular containment part, a casing would be formed by winding successive turns of the sandwiched material around a mandrel or the like of typically but not exclusively, nominally circular cross-section. A means of securing the initial end of the first wind onto the mandrel would be incorporated into the mandrel design.

Once made into a tubular containment part, one of several mechanical constraints available in the art would be used to keep the wound tube in shape as it is removed from the mandrel and transferred to an autoclave or similar heat curing device if pre-preg fibre materials are used. Further, multiple casings of the same final internal diameter could be made by slitting the composite sandwich strip materials that make up each continual sandwich layer—as they are spooled off from the bulk single layer material coils, thus enabling parallel manufacture of containment 'tube' assemblies.

The method according to the invention provides an improvement over the prior art in that the containment casing can be made as a continual process which is therefore cheaper and can be configured to resist the fragment energy containment requirements of different flywheel energy storage device designs through configuration of steel gauge, grade and number of composite and metal inter-layers, as well as by configuration of the woven fibre and weave, polymer matrix and curing system elements. Furthermore, the method provides for an industrially viable means of quick and simple configuration of several layers (metallic, non-metallic, fibrous etc) of material into a tubular containment part in one operation; followed by the co-curing or post-curing of the entire tubular containment part, in a line manufacturing process.

BRIEF DESCRIPTION OF THE DRAWINGS

The invention is further explained by means of the manufacturing operation example shown schematically in the drawing with a spirally wound tubular containment part in cross-section.

DETAILED DESCRIPTION OF THE DRAWINGS

In the FIGURE manufacture of an example containment casing onto mandrel 1 with innermost, first layer 2 of a structural material is shown, wherein the first structural layer is of a strong and tough steel strip such as S900, S960, high strength bainitic steel or other high carbon steel that exhibits an appropriate elongation, strength and toughness performance.

The next layer 3 is comprised of pre-impregnated woven aramid fibre, which can be of various weave, fibre angle combinations and thickness.

The successive layers 4 and 5 are formed using thin (0.1 mm) but high elongation steel sheet interspersed with pre-preg layers of e.g. about 45/45 degree-carbon-fibre.

The outermost layer 6 (those furthest from the first steel layer 2) are comprised of further thin steel and/or aluminium sheet interspersed with woven 2000-4000 MPa ultimate tensile strength tyre cord and pre-preg glass fibre to further contain lower speed but higher temperature fragments.

The choice of the materials for the steel layers and the fibre inter-layers will be as required by typical flywheel designs for different industries, i.e. thicker layering and/or more windings for rail and power generation flywheel systems, and thinner and/or fewer layers for e.g. automotive and other mobile flywheel system applications. There may be more or less layers than shown in the diagram and permutations of the layers may be configured as suitable to the energy containment need for the flywheel type. Further, a line wet layup and pre-curing stage 7 as well as slitting stages may be inserted between the bulk materials coils and the mandrel.

In order to make a choice of the materials for the steel layers and the fibre layers, the kinetic fragment energy levels would be established that relate to the requirements for worst-case fragment containment at the desired flywheel design diameter and safety case speed.

On basis of that information the number of, the gauge, the width and the steel grades (and other metallic inter-layer grades) appropriate to the fragmentation containment are configured. Further the woven fibre interlayer and matrix adhesive combination that meets the fragment energy containment requirements will also be defined.

The gauge and grade of the steel and other metallic grades required will be chosen on the basis of toughness, strain-rate sensitivity, surface hardness, elongation, weldability, yield strength, ultimate tensile strength, density and cost.

The composite grade and fibre material (including layup directionality) choices, will be made on the basis of tensile strength, resin matrix bond, energy absorbtion performance, weight and cost.

Steels between 0.15 and 2.5 mm including grades such as 5960, TWIP packaging and dual-phase grades may be chosen to suit toughness, ductility and energy-absorption requirements. Prepreg carbon fibre and aramid grades may be selected for reasons of cost and strength as well as suitability to their autoclave curing temperature and performance profile.

When the materials and structure for the tubular containment part are defined, the specified materials are fed into a continual production line to form the multilayered tubular containment part.

The resulting diameter and wall-thickness 'spiral-wrapped' tubular containment part is then cured in a manner appropriate to the resin system and steel grade selected— which may include the use of oven-curing of the final component using the appropriate temperature bake and/or metal joining method(s) where e.g. steel fibres such as tyre cord are used in the sandwich layers. A means of online curing may also be considered. To keep the casing tube in shape suitable tubing heat-shrunk over the formed tube, or mechanical clamping arrangement may be used as the resins or other adhesive matrix cures.

The invention claimed is:

1. A tubular containment part for a flywheel containment assembly, said tubular containment part comprising a single outer sidewall and a single inner sidewall,
    wherein the tubular containment part is made up of continuous layers, spirally wound over each other so all windings of the continuous layers overlap, the continuous layers comprising:
        a first continuous layer of a first structural material and one or more successive continuous layers of one or more different materials which differ from the first structural material,
    wherein the first continuous layer and at least one of said one or more successive continuous layers are spirally co-wound together overlapping said first continuous layer and at least one of said one or more successive continuous layers to form a first spiral of the first continuous layer interleaved with a spiral of said at least one of said one or more successive continuous layers,
    wherein the single inner sidewall consists of a first winding of the first continuous layer,
    wherein said first continuous layer of said first structural material and at least one of said one or more successive continuous layers of said different materials are each wound over at least more than one winding thereby forming a sandwich of the first continuous layer and at least one of said one or more successive continuous layers,
    wherein the first structural material is steel.

2. The containment part according to claim 1, wherein the one or more successive continuous layers are each made of a strip or web of one or more materials selected from the group consisting of aluminium, aluminium alloys, fibre materials and alloy steels.

3. The containment part according to claim 2, wherein the fibre materials comprise one or more members of the group consisting of aramid fibres, nylon fibres, glass fibres, carbon fibres, and steel fibres.

4. The containment part according to claim 2, wherein the fibre materials are embedded in a cured resin.

5. The containment part according to claim 2, wherein within a layer of fibre material or within different layers of fibre material the fibres are provided in groups with different warp and/or weft orientations with respect to each other.

6. The containment part according to claim 2, wherein each of the one or more successive continuous layers is a metal layer made of a strip or web of one or more materials selected from the group consisting of aluminium, aluminium alloys, and alloy steels, and one or more of the metal layers is corrugated.

7. The containment part according to claim 6, wherein the voids formed by the corrugations are filled with phase-change material to further enhance fragment energy absorption.

8. A flywheel containment assembly comprising the tubular containment part according to claim 1, wherein the tubular containment part is mounted at opposite sides in a groove cut into respective end members of the containment assembly.

9. The containment part according to claim 1, wherein the first and the one or more successive continuous layers comprise a multi-layered strip of at least two layers of said different materials.

10. The containment part according to claim 1, wherein at least one of the one or more successive continuous layers is made of a strip or web of one or more materials selected from the group consisting of aluminium, aluminium alloys, fibre materials and alloy steels.

11. The containment part according to claim 1, wherein at least one of the one or more of the successive continuous layers comprise one or more fibre materials selected from the group consisting of aramid fibres, nylon fibres, glass fibres, carbon fibres, and steel fibres.

12. The containment part according to claim 1, wherein the one or more different materials are one or more metal layers made of a strip or web of one or more metals selected from the group consisting of steel, aluminium, aluminium alloys, and alloy steels.

13. The containment part according to claim 1, wherein at least one of said one or more successive continuous layers are made of a strip of one or more metals selected from the group consisting of aluminium, aluminium alloys, alloy steels, and steel different from the first structural material.

14. A tubular containment part for a flywheel containment assembly, said tubular containment part comprising a single outer sidewall and a single inner sidewall,
- wherein the tubular containment part is made up of continuous layers spirally wound over each other so all windings of the continuous layers overlap, the continuous layers comprising
  - a first continuous layer of a first structural material and
  - one or more successive continuous layers made up of one or more different materials which differ from the first structural material,
- wherein the first continuous layer and at least one of said one or more successive continuous layers are spirally co-wound together overlapping said first continuous layer and at least one of said one or more successive continuous layers to form a first spiral of the first continuous layer interleaved with a spiral of said at least one of said one or more successive continuous layers,
- wherein the angular inner sidewall consists of a first winding of the first continuous layer,
- wherein said first continuous layer of said first structural material and at least one of said one or more successive continuous layers of said different materials are each wound over at least more than one winding thereby forming a sandwich of the first continuous layers and at least one of said one or more successive continuous layers,
- wherein the first continuous layer of the first structural material is a steel strip, wherein the steel is selected from the group consisting of high-strength low-alloy steel, bainitic steels, TWIP grades and medium to high carbon steels.

15. The containment part according to claim 14, wherein at least one of said one or more successive continuous layers are made of one or more metals selected from the group consisting of aluminium, aluminium alloys, alloy steels, and steel different from the first structural material.

16. A method for the manufacturing of a tubular containment part for a flywheel containment assembly, said tubular containment part comprising a single outer sidewall and a single inner sidewall;
- wherein the method comprises the steps of:
  - selecting a steel strip for a first continuous layer of structural material, wherein the steel is selected from the group consisting of high-strength low-alloy steel, bainitic steels, TWIP steel grades and medium to high carbon steels,
  - selecting a strip or web of a material for each of one or more successive continuous layers from the group of materials consisting of aluminium, aluminium alloys, fibre materials and alloy steels, and
  - winding the strips of the first continuous layer and at least one of said one or more successive continuous layers into a spiral such that the layers of different materials of the tubular containment part are continuous layers spirally wound over each other so all windings of the layers overlap, the continuous layers comprising a first continuous layer of a first structural material and at least one of said one or more successive continuous layers made up of one or more different materials,
- wherein the first continuous layer and at least one of said one or more successive continuous layers are spirally co-wound together overlapping said first continuous layer and at least one of said one or more successive continuous layers to form a first spiral of the first continuous layer interleaved with a spiral of said at least one of said one or more successive continuous layers,
- wherein the inner sidewall consists of a first winding of the first continuous layer,
- wherein said first continuous layer of said first structural material and at least one of said one or more successive continuous layers of said different materials are wound over at least more than one winding thereby forming a sandwich of the first continuous layer and at least one of said one or more successive continuous layers.

17. The method according to claim 16, wherein one or more of the successive continuous layers comprises a fibre material impregnated with a curable resin and wherein the spirally wound layers are subjected to a curing operation.

18. The method according to claim 17, wherein the curing operation is carried out after winding the first and the one or more successive continuous layers into the tubular containment part.

19. The method according to claim 17, wherein the fibre materials are impregnated and cured using continual wet layup processes.

20. The method according to claim 16, wherein the layers are wound around a mandrel of nominally circular or other cross-section.

21. The method according to claim 16, wherein the first and the one or more successive continuous layers comprise a multi-layered strip of at least two layers of said different materials wound from a coil of the multi-layered strip.

* * * * *